March 15, 1966  F. J. CALLAHAN, JR., ETAL  3,240,346
IN-LINE REMOVABLE FILTER
Filed Nov. 6, 1961
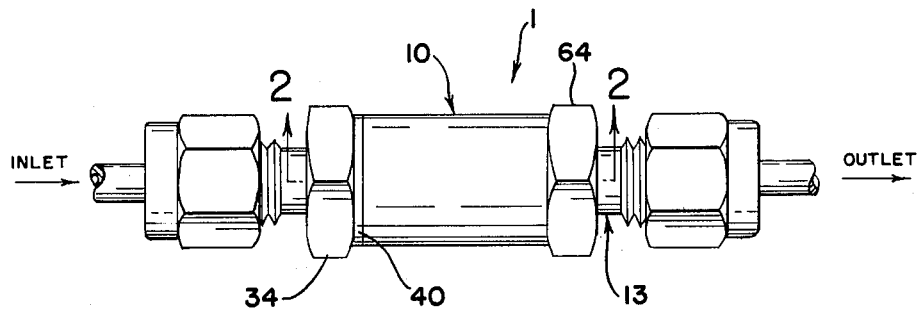
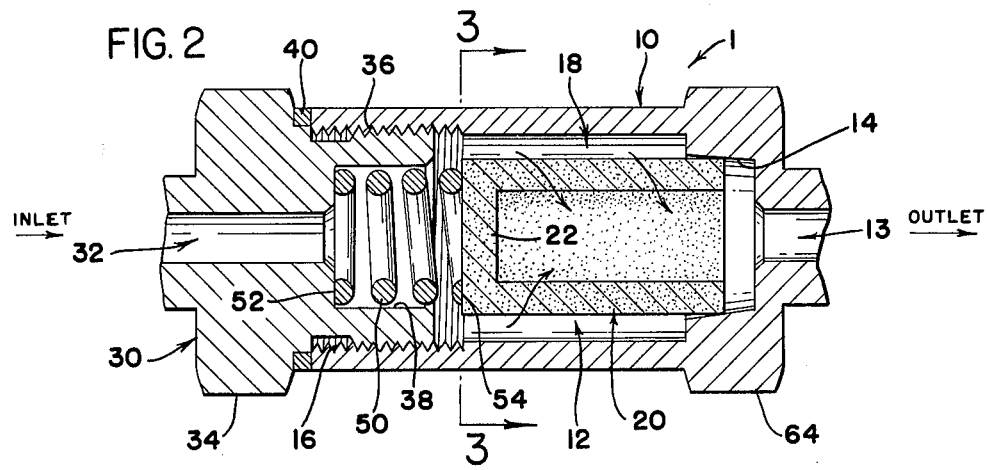
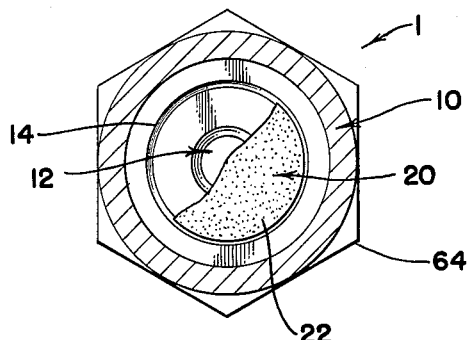
INVENTORS
FRANCIS J. CALLAHAN, JR. &
BERNARD J. GALLAGHER
BY
*Fay & Fay*
ATTORNEYS

United States Patent Office 3,240,346
Patented Mar. 15, 1966

3,240,346
IN-LINE REMOVABLE FILTER
Francis J. Callahan, Jr., Chagrin Falls, and Bernard J. Gallagher, Cleveland Heights, Ohio, assignors to Nuclear Products Company, Cleveland, Ohio, a corporation of Ohio
Filed Nov. 6, 1961, Ser. No. 150,480
3 Claims. (Cl. 210—446)

This invention concerns an efficient in-line mounted filter structure having only metal parts. This novel structure is designed to be used in high-temperature and high-pressure applications where a large filtering area must be provided in a small space. In its broadest aspect the invention comprises a rigid filter element press-fitted into a tapered counterbore in an outer body member and sealed by means of a metal gasket.

In general the filter structure of this invention may be used wherever fluid system contamination must be avoided. It is adapted particularly for mounting upstream from solenoids or metering valves on instrument, air, and fluid control systems for use on all types of cooling systems for machinery and electronic equipment. Mounted in this manner, the filter acts efficiently to reduce wear and prevent clogging of orifices and clearances between mating parts so that the protected equipment can function as intended.

Previously, the known filters of this general type have utilized filter elements and sealing gaskets of organic material subject to deterioration under extreme temperatures and pressures. Furthermore, the prior in-line mounted filters have provided only limited exposed filter element areas in bulky housings which are not readily adaptable to installation in tight places. Moreover, these known filter structures have had restricted flow areas which create pressure drop and turbulence and inadequate seals which permit bypass flow of the contaminated fluid.

With the foregoing shortcomings of the prior art in mind, it is the general object of this invention to provide an improved in-line mounted filter device which withstands high temperatures and high pressures and which is of compact size.

It is a further object of the invention to provide an in-line filter structure with an element which has a large exposed filter area and unrestricted flow areas.

It is a still further object of the invention to provide a leak-tight in-line filter structure having a filter element press-fitted into a counterbore to prevent bypass flow of the contaminant fluid.

Other and more specific objects of the invention will become apparent from the detailed description to follow. Generally, the invention contemplates a flow-line filter structure comprising an elongated outer body having a passageway which includes a threaded portion adjacent one end thereof and a tapered portion adjacent the opposite end thereof, with its largest diameter adjacent the threaded portion. A more or less rigid filter element is press-fitted into the tapered portion to prevent bypass flow of the contaminant fluid. An inner body is provided which has a counterbored passageway and an outer surface with a radially directed flange portion and a threaded portion for cooperation with the threaded portion of the outerbody passageway. A metal gasket, held under compression, creates a seal between the flange portion and the outer body and a spring, held under compression between the filter element and the counterbore of the inner body passageway retains the filter element within its seated position.

In the use of the filter of the invention, as with all filters, a deposit termed a filter cake accumulates on the element during usage. This filter cake in actuality increases the efficiency of the filter element and removes some smaller particles, depending on the amount of flow, the type of fluid, the amount of contaminant present, and the size and type of the element. The filter element may last for a few hours to many weeks without having to be changed.

A distinct advantage of the invention is the arrangement whereby the filter element is press-fitted into a counterbore in the housing member so that there is no possibility of bypass flow by the contaminated fluid.

A further advantage of the novel structure is the large exposed element area which provides a filtering area larger than that available in most in-line mounted filters on the market at the present time.

A still further advantage of this invention is the provision of the metal gasket which permits use of the filter in high-temperature, high-pressure applications where rubber gaskets would fail.

Another advantage of the filter structure of the invention is the provision of integral tube connections which enable a compact in-line assembly.

Still another advantage of the structure is that the possibility of a back-pressure surge unseating the element is reduced by using a high force type spring.

Referring now to the drawings:

FIG. 1 is a side elevation of the filter assembly mounted in a fluid line.

FIG. 2 is an elongated longitudinal sectional view of the valve structure along the line 2—2 of FIG. 1.

FIG. 3 is a cross-sectional view along the line 3—3 of FIG. 2.

Describing now more particularly the filter structure illustrated in the drawings, wherein like numerals designate like parts in the several views. A novel filter structure according to the principles of the invention is designated generally by the numeral 1. The structure comprises an outer body member 10 which is in the form of a cylinder having an outwardly disposed, hexagonally shaped flange member 64 on one end thereof. An axial passageway 12 is provided in the outer body and includes a threaded portion 16 on its end opposite the flange 64 and a tapered portion 14 on the end adjacent the flange 64 with its largest diameter facing inwardly away from the end. The tapered portion 14 makes an angle of substantially 3° with the axis of the passageway 12 and is preferably of 0.125 inch ±0.001 inch long. The taper is concentric with the major portion of the passageway 12 but is of substantially smaller diameter to provide for an unrestricted flow path between the filter element 20 and the outer body member 10 as shown at 18. The passageway 12 has a coaxial outlet or extension portion 13 of smaller diameter communicating with the tapered portion 14 adjacent its smaller diameter, such that the tapered portion 14 is in effect a counterbore of the passageway extension portion 13. A hollow cylindrical filter element, preferably having a diameter equal to the sum of the larger and smaller diameters of the portion 14 divided by two and manufactured to tolerances of ±0.003 inch, is press-fitted into the tapered portion 14 under a force of from 2 to 3 pounds. The opposite end of the hollow cylindrical element is closed by the integral wall 22 and the force preferably is obtained by several light taps on said wall with a rubber hammer.

An inner body member 30 is provided for engagement with the outer body member 10 and includes an outwardly disposed hexagonally-shaped flange member 34, an axial inlet passageway 32 with counterbore 38 on its inner end, and threaded portion 36 on its outer surface adapted to cooperate with the threaded portion 16 of the outer body member. An annular metal gasket 40 is disposed on the inner body adjacent the flange 34 so that when the inner body 30 and the outer body 10 are tightened in threaded engagement, the gasket 40 is compressed to form a very effective high pressure seal which is resistant to deterioration at temperatures up to at least 1,000° F.

Disposed between the base of the counterbore 38 in the inner body 30 and the endwall 22 of the filter element is a metal spring 50. The end turns of the metal spring 50 preferably are flattened as shown at 52 and 54 to provide parallel surfaces for transferring direct axial force to the filter element 20. This axial force prevents a back pressure surge from unseating the element from its press-fit engagement in the tapered portion 14 of the outer body member and provides for a certain amount of variation in the press-fitted position of the element 20 in the tapered portion 14.

The passageways and counterbores of the elements of the structure are all coaxially aligned to provide minimum pressure drop and turbulence. The inlet passageway 32 and outlet passageway extension 13 are of the same diameter as the tubing of the line to which they are to be connected. The hexagonally-shaped flanges 34 and 64 on the inner body 30 and the outer body 10, respectively, are of the same size to minimize the tools needed for assembly and disassembly of the filter structure. On the outermost ends of the inner body 30 and the outer body 10 are provided integral double-ferrule type tube fitting means. These features provide a compact structure which, when used with a ¼ inch tubing line, for instance, has an overall length of three inches and a hex size of ¾ inch on the flanges 34 and 64. A conventional fitting hex size of 9/16 inch is provided to eliminate the need for special tools or additional fittings when installing the filter structure in a line or changing a filter element.

To change the filter element, the filter is removed from the line and disassembled by unthreading the outer body member 10 and the inner body member 30. A blunt end piece of rod of similar device is pushed through the passageway 13 of the outer body and tapped lightly against the inner surface of the wall 22 until the element 20 is forced free. The new element is installed by placing the outer body member 10 upright in a vise. The new element 20 then is lined up with the tapered portion 14 of the outer body member and tapped lightly, applying 2 to 3 pounds of force. This force press-fits the element into its tapered seat 14. The filter then is reassembled by threading the inner body member 30 into the outer body member 10 with the spring 50 between the element 20 and the counterbore 38, and the gasket 40 between the flange 34 of the inner body member and the end of the outer body member 10. The body members then are tightened to seal the gasket 40 and compress the spring 50. The structure then is reconnected to the line by means of the integral fittings.

The filter of the invention may be used to trap all kinds of particles. Coarse non-compressible particles are easiest to filter since slimy compressible particles tend to slip through the smaller pores and pack together rapidly, restricting flow. Basically the onstream time before an element must be changed depends on the amount of flow, the type of fluid, the amount of contaminant present, and the size and type of the element. A filter that may last only a few hours in one system, may last many weeks in another. A pressure drop is sometimes used as a signalling device. Two pressure gauges or a U-type manometer are connected close to the inlet and outlet sides of the filter. When the pressure drop reaches a predetermined maximum allowable point, the element is changed or cleaned.

Examples of some of the many materials which may be used in constructing the filter according to this invention are:

For the body parts, brass or type 316 stainless steel.
For the gasket, aluminum with brass bodies and annealed type 316 stainless steel with stainless steel bodies.
For the spring, type 302 stainless steel.
For the filter element, ceramic material or type 316 sintered stainless steel.

The nuts and ferrules usually are of the same materials as the body parts.

For ease of description, the principles of the invention have been set forth with but a single illustrated embodiment, but it is not our intention that the illustrated embodiment or the terminology employed in describing it to be limiting, inasmuch as many variations may be made from these without departing from the spirit of the invention. Rather, we desire to be restricted only by the scope of the appended claims.

What is claimed is:

1. A high temperature flow line filter structure comprising an elongated outer body having a passageway with a tapered internal surface portion adjacent one end of said body and a threaded portion adjacent the opposite end of said body, said tapered internal surface portion having its larger diameter closer to said threaded portion than its smaller end, a cylindrical cup-shaped filter element having a lip tightly sealed in direct engagement with said tapered internal surface portion, an inner body having a counterbored passageway and an outer surface with a radially directed flange portion and a threaded portion cooperating with the threaded portion of the outer body passageway, a metal gasket under compression between the flange portion and the outer body, and a spring under compression against and between the filter element and the counterbore of the inner body passageway.

2. The high temperature flow line filter structure of claim 1 in which the cylindrical cup-shaped filter element has a lip diameter dimension relative to said tapered internal portion which permits the engagement of the said element and the said tapered internal portion in a press fit.

3. A high temperature flow line filter structure comprising an elongated outer body having a passageway with a tapered internal surface portion adjacent one end of said body and a threaded portion adjacent the opposite end of said body, said tapered internal surface portion having its larger diameter closer to said threaded portion than its smaller end, a cylindrical cup-shaped filter element having a lip tightly sealed in direct engagement with said tapered internal surface portion, an inner body having a passageway and an outer surface with a radially directed flange portion and a threaded portion cooperating with the threaded portion of the outer body passageway, a metal gasket under compression between the flange portion and the outer body, and a spring under compression against and between the filter element and the inner body.

References Cited by the Examiner

UNITED STATES PATENTS

| | | | |
|---|---|---|---|
| 768,951 | 8/1904 | Rawson | 210—448 |
| 851,194 | 4/1907 | Archer | 210—510 X |
| 2,378,949 | 6/1945 | Post | 210—510 X |
| 2,748,802 | 6/1956 | Hanson et al. | 210—510 X |
| 2,761,529 | 9/1956 | Wisenbaugh | 210—452 X |
| 2,819,799 | 1/1958 | Wilkerson | 210—430 |
| 2,932,398 | 4/1960 | Korte | 210—223 |

REUBEN FRIEDMAN, *Primary Examiner.*

HERBERT L. MARTIN, *Examiner.*